US010560362B2

(12) United States Patent
Wang et al.

(10) Patent No.: US 10,560,362 B2
(45) Date of Patent: Feb. 11, 2020

(54) APPLICATION CONTROL

(71) Applicant: Fortinet, Inc., Sunnyvale, CA (US)

(72) Inventors: Wei Wang, North Vancouver (CA); Junfeng Jia, Burnaby (CA)

(73) Assignee: Fortinet, Inc., Sunnyvale, CA (US)

(*) Notice: Subject to any disclaimer, the term of this patent is extended or adjusted under 35 U.S.C. 154(b) by 564 days.

(21) Appl. No.: 14/553,624

(22) Filed: Nov. 25, 2014

(65) Prior Publication Data
US 2016/0149792 A1     May 26, 2016

(51) Int. Cl.
*H04L 29/06*     (2006.01)
*H04L 12/26*     (2006.01)
(Continued)

(52) U.S. Cl.
CPC .......... *H04L 43/12* (2013.01); *H04L 41/12* (2013.01); *H04L 47/2475* (2013.01); *H04L 47/2483* (2013.01); *H04L 69/03* (2013.01)

(58) Field of Classification Search
CPC . H04L 67/104; H04L 63/102; H04L 67/1085; H04L 47/10; H04L 47/2475; H04L 47/2483; H04L 47/2441; H04L 63/1408; H04L 67/22; H04L 69/03; H04L 69/329; H04L 67/10; H04L 67/327; H04L 41/142; H04L 43/18; H04L 63/0245; H04L 47/04; H04L 63/1425; H04L 63/1416; H04L 43/08; H04L 67/303; H04L 67/14; H04L 61/2007; H04L 47/365; H04L 43/50; H04L 43/10; H04L 69/22; H04L 63/0227; H04L 63/0263; H04L 43/028; H04L 43/04; G06K 9/6256; G06K 9/6262; G06K 2209/01; G06K 9/00288; G06K 9/036;
(Continued)

(56) References Cited

U.S. PATENT DOCUMENTS 6,412,000 B1 * 6/2002 Riddle .................... H04L 29/06
370/230
7,644,150 B1 * 1/2010 Nucci et al. .......... G06F 15/173
709/223
(Continued)

OTHER PUBLICATIONS

Deng et al. Ensemble Learning Model for P2P Traffic Identification, Aug. 2014, IEEE, 2014 11th International Conference on Fuzzy Systems and Knowledge Discovery (ESKD), pp. 445-449 (Year: 2014).*

*Primary Examiner* — Backhean Tiv
*Assistant Examiner* — Linh T. Nguyen
(74) *Attorney, Agent, or Firm* — Jaffery Watson Mendonsa & Hamilton, LLP (57) ABSTRACT

Systems and methods for controlling applications on a network are provided. According to one embodiment, a network security device intercepts network traffic and conducts a heuristic detection of an application protocol used in the network traffic by multiple application protocol identifying engines defined in a heuristic rule. According to another embodiment, the network security device confirms a suspect application protocol as an actual application protocol used in the network traffic by sending a probing request to the destination peer of the network traffic based on the suspect application protocol. The suspect application protocol is confirmed if an appropriate response is received from the destination peer.

10 Claims, 6 Drawing Sheets

(51) Int. Cl.
*H04L 12/851* (2013.01)
*H04L 12/859* (2013.01)
*H04L 12/24* (2006.01)

(58) Field of Classification Search
CPC .......... G06K 9/00744; G06K 9/00536; G06K 9/6267; G06F 17/30598; G06N 99/005; G06N 3/08; G06N 5/04
USPC .... 709/224, 202, 203, 223, 231; 706/10, 12, 706/25, 46; 370/235
See application file for complete search history.

(56) References Cited

U.S. PATENT DOCUMENTS

| | | | | |
|---|---|---|---|---|
| 7,996,520 | B2* | 8/2011 | Weil | H04L 63/1416 709/224 |
| 2003/0053615 | A1* | 3/2003 | Anderson | G06Q 30/02 379/265.09 |
| 2005/0105476 | A1* | 5/2005 | Gotesdyner et al. | H04L 12/28 370/254 |
| 2005/0251406 | A1* | 11/2005 | Bolt | H04M 15/00 726/23 |
| 2006/0068806 | A1* | 3/2006 | Nam | H04L 63/1408 455/452.2 |
| 2007/0226781 | A1* | 9/2007 | Chen | H04L 9/32 726/4 |
| 2008/0126556 | A1* | 5/2008 | Perng et al. | G06F 15/16 709/231 |
| 2008/0140589 | A1* | 6/2008 | Basu et al. | G06F 18/15 706/12 |
| 2009/0018981 | A1* | 1/2009 | Zhang et al. | G06F 18/15 706/12 |
| 2010/0054260 | A1* | 3/2010 | Pandey | H04L 49/00 370/395.53 |
| 2010/0169195 | A1* | 7/2010 | Trest | G06Q 30/0185 705/34 |
| 2010/0182918 | A1* | 7/2010 | Clevy | H04L 41/142 370/252 |
| 2010/0284300 | A1* | 11/2010 | Deshpande | H04L 43/026 370/253 |
| 2011/0040706 | A1* | 2/2011 | Sen et al. | G06F 15/18 706/52 |
| 2012/0079101 | A1* | 3/2012 | Muppala | H04L 47/2441 709/224 |
| 2013/0258863 | A1* | 10/2013 | Wei | G06F 21/554 370/241 |
| 2014/0032120 | A1* | 1/2014 | Eriksen et al. | H04L 12/851 370/241 |
| 2014/0059216 | A1* | 2/2014 | Jerrim | H04L 67/104 709/224 |

* cited by examiner

APPLICATION CONTROL

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present invention generally relate to the field of computer networks. In particular, various embodiments relate to methods and systems for identifying network applications based on heuristic rules and active probing.

Description of the Related Art

There has been a constant increase in peer-to-peer (P2P) applications running over the Internet during the past few years. P2P file sharing applications constitute a significant share of the total traffic of the Internet. When a P2P application is running on a computer within a private network and sharing files with other peers, it may consume a significant amount of bandwidth of the private network. P2P file sharing may also cause copyright or network security problems. In order to control the P2P applications or other applications running on a private network, traffic going through the private network may be inspected by a gateway or firewall that controls the private network. A network application may be identified by port-based analysis, pattern-based analysis and/or behavioral-based analysis.

Port-based analysis is a method for identifying protocols by matching port numbers of data packet with that defined in known protocols. However, port-based analysis may fail to identify a protocol if a random or dynamic port is used by a network application.

Pattern-based analysis is a method for identifying network protocols by inspecting the data payloads of the data packets according to some previously defined application signatures. The firewall may perform regular expression matching on the application layer data, in order to determine whether a special application is being used. Some P2P software has regular updates and changes the underlining P2P library which might generate new traffic patterns. The protocol-based analysis may fail if the signatures of the P2P software are not up to date. Moreover, some P2P applications tend to tunnel around P2P controls placed in their way by encrypting the traffic. Pattern-based analysis for identifying P2P becomes much more difficult because payloads of the data packets have to be decrypted.

Behavioral-based analysis is a method for identifying network protocols by tracing the traffic behaviors of clients without examining the payloads of the packets. Behavioral-based analysis of network protocols may include the trend of packet size changes, specific traffic patterns and the like. As some P2P software purposely obfuscate their traffic pattern in order to evade detection, behavioral analysis may also fail to identify P2P applications.

Therefore, there is a need for improving application identification of network traffic.

SUMMARY

Systems and methods are described for controlling applications on a network. According to one embodiment, a network security device intercepts network traffic, the network security device conducts a heuristic detection of an application protocol used in the network traffic by multiple application protocol identifying engines based on a heuristic rule.

According to another embodiment, a network security device detects a suspect application protocol used in the network traffic and then sends a probing request to the destination peer of the network traffic based on the suspect application protocol. The suspect application protocol is confirmed if a response in accordance with the protocol is received from the destination peer.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Systems and methods are described for controlling applications on a network. According to one embodiment, a network security device intercepts network traffic, the network security device conducts a heuristic detection of an application protocol used in the network traffic by multiple application protocol identifying engines based on a heuristic rule.

According to another embodiment, a network security device detects a suspect application protocol used in the network traffic and then sends a probing request to the destination peer of the network traffic based on the suspect application protocol. The suspect application protocol is confirmed if a response in accordance with the protocol is received from the destination peer.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security devices (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

If the specification states a component or feature "may", "can", "could", or "might" be included or have a characteristic, that particular component or feature is not required to be included or have the characteristic.

The term "server" generally refers to an application, program, process or device in a client/server relationship that responds to requests for information or services by another program, process or device (a server) on a network. The term "server" also encompasses software that makes the act of serving information or providing services possible.

Figure 1:
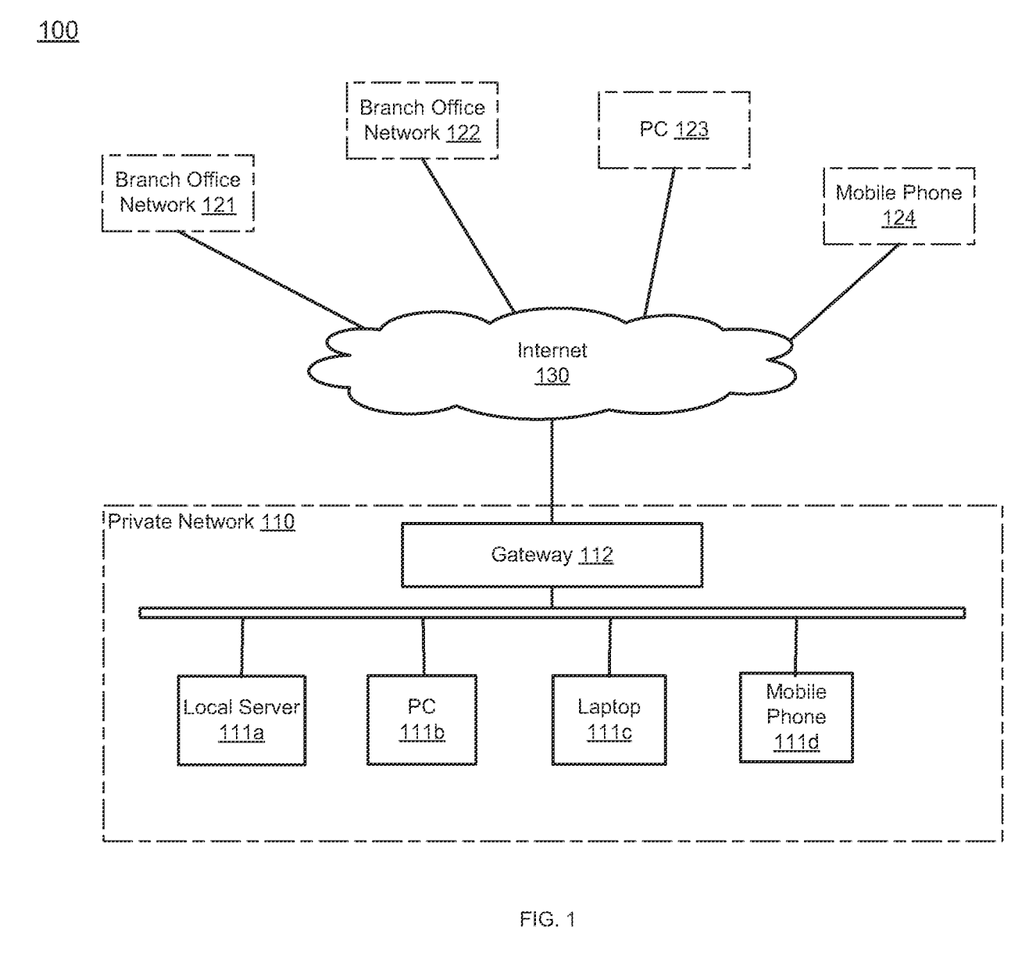
FIG. 1 is a block diagram illustrating a private network in which embodiments of the present invention may be employed.

FIG. 1 illustrates an exemplary network architecture in accordance with an embodiment of the present invention. Network architecture 100 shown in FIG. 1 comprises a private network 110, multiple branch office networks 121 and 122. The private network 110 and branch office networks 121 and 122, PC 123 and mobile phone 124 are connected through internetworks (e.g., the Internet 130). Private network 110 includes multiple network appliances, such as local server 111a, PC 111b, laptop 111c, mobile phone 111d and other computing devices that are operatively coupled to each other through a Local Area Network (LAN), wherein the LAN is then operatively coupled with gateway 112 which enables access to Internet 130. Gateway 112 separates the external computing environment, represented by Internet 130, from the internal computing environment of private network 110. Gateway 112 may intercept communications between Internet 130 and the network appliances of private network 110 and scan for malware, viruses or other high risk network accesses. The internal structures of branch office networks 121 and 122 are omitted as they may be similar to that of private network 110.

In the embodiment shown in FIG. 1, gateway 112 is a rule-based security device that controls traffic going through its interfaces. Usually, gateway 112 includes multiple physical network interfaces, including, but not limited to an internal interface with 4-24 or more Ethernet ports, 1-4 or more wide area network (WAN) interfaces and one demilitarized zone (DMZ) interface. Further, when private network 110 is separated into multiple virtual LANs (VLANs), gateway 112 may also define multiple virtual interfaces for each of the VLANs.

Gateway 112 includes a rule set with multiple rules created by the network administrator that controls the traffic going through gateway 112. In the context of each rule, traffic is typically identified by source interfaces, destination interfaces, source Internet Protocol (IP) addresses, destination IP addresses, users/user groups, devices and/or other parameters of the traffic. After the traffic flow is defined, an action controlling the traffic flow, e.g., accept or deny, is designated in each rule. In operation, all traffic going through interfaces of gateway 112 is captured by gateway 112. The source interface, destination interface and other parameters of the captured traffic flow are matched with those of each rule of a rule set. The first matched rule in the rule set is typically used for controlling the traffic flow and the traffic flow is processed based on the action defined in the matched rule.

In addition to traffic rules, the network administrator of gateway 112 may also configure application control sensors at the gateway 112. The application control sensors are modules that are capable of detecting an application that generates network traffic passing through gateway 112. Application control sensors may also control the transmission of network traffic generated by the application based on rules associated to the application defined by network administrators. When application traffic is detected, unwanted applications can be blocked and access control, traffic shaping, antivirus protection, antispyware protection, intrusion prevention, and other unified threat management (UTM) features can be applied to the application traffic that is allowed. In an exemplary embodiment of the present invention, gateway 112 may be a FORTIGATE gateway available from Fortinet, Inc. of Sunnyvale, Calif. (FORTIGATE is a trademark or registered trademark of Fortinet, Inc.).

Figure 2:
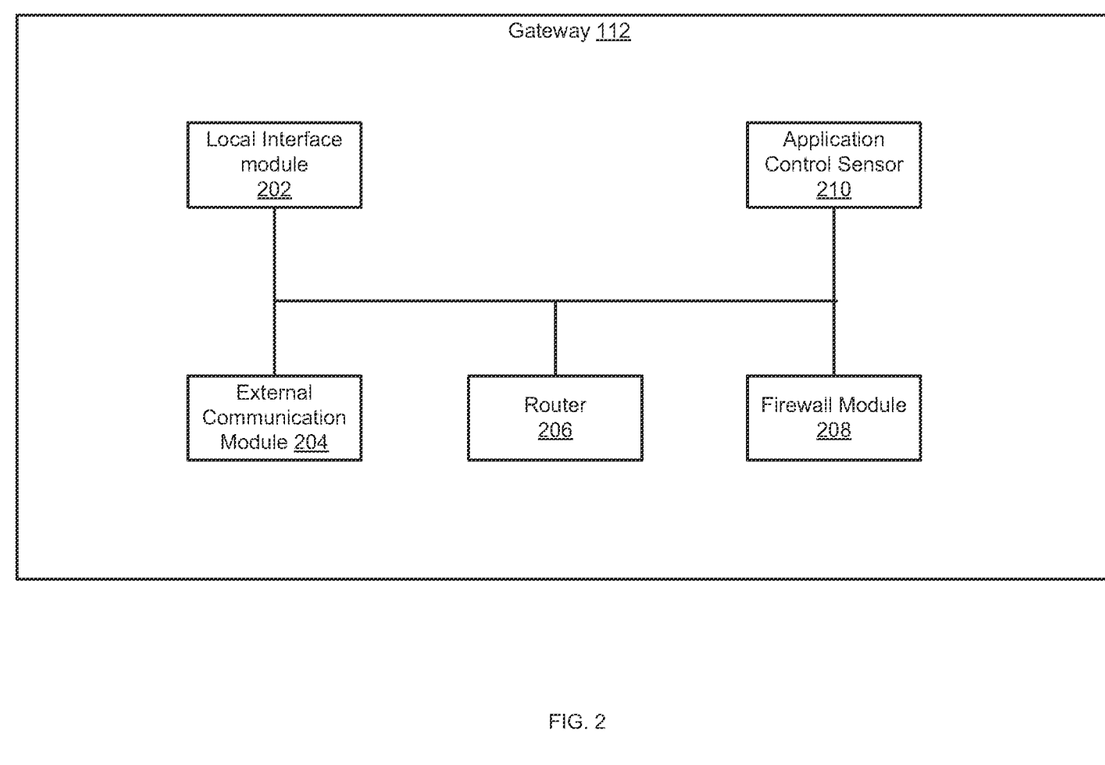
FIG. 2 is a block diagram conceptually illustrating interactions among various functional units of a gateway in accordance with an embodiment of the present invention.

FIG. 2 is a block diagram conceptually illustrating interactions among various functional units of gateway 112, in accordance with an embodiment of the present invention. Gateway 112 includes a local interface module 202, an external communications module 204, a router 206, a firewall module 208 and an application control sensor 210.

According to one embodiment, the local interface module 202 provides a physical and data-link layer communication interface with one or more computer systems, e.g., computer systems 111a-d. Local interface module 202 accepts and provides IP packets over an internal data path and interfaces with the network link. External interface module 204 accepts and provides IP packets over data paths from and to other modules in gateway 112, and provides physical and data-link layer interfaces to a communication link that couples gateway 112 to the external network.

Further, external communication module 204 is coupled to router 206. Router 206 accepts IP packet from a number of data paths within gateway 112, and routes those packets to other data paths. For example, router 206 accepts IP packets over a data path from the local interface module 202. Furthermore, router 206 is connected to firewall module 208. Firewall module 208 adds a level of protection between computer systems 111a-d, and permits or denies network transmissions based upon a set of rules. The rules are run and the outcome is then communicated by firewall module 208 to external communications module 204 and an action is taken accordingly.

Gateway 112 further comprises an application control sensor 210. In an embodiment, application control sensor 210 is capable of detecting an application that generates network traffic passing through gateway 112. Application control sensor 210 analyzes data packets or communication sessions captured by gateway 112 to identify a protocol being used by the data packets or communication sessions or an application that generated the data packets or communication sessions. According to an embodiment, application control sensor 210 includes a heuristic application identification module and an active probing module. The heuristic application identification module may identify a protocol that is used by the network traffic based on a heuristic rule defined by network administrators. The active probing module may be used for verifying a suspect protocol. In order to verify whether the suspect protocol is correct or not, a probing request based on the suspect protocol is sent to a destination peer of the network traffic. If a valid response to the probing request is received from the destination peer, the active probing module may confirm that the suspect protocol is indeed used by the network traffic and the peer is indeed providing a service in relation to the protocol.

According to various embodiments of the present invention, the functional modules can be any suitable type of logic (e.g., digital logic) for executing the operations described herein. Any of the functional modules used in conjunction with embodiments of the present invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 3:
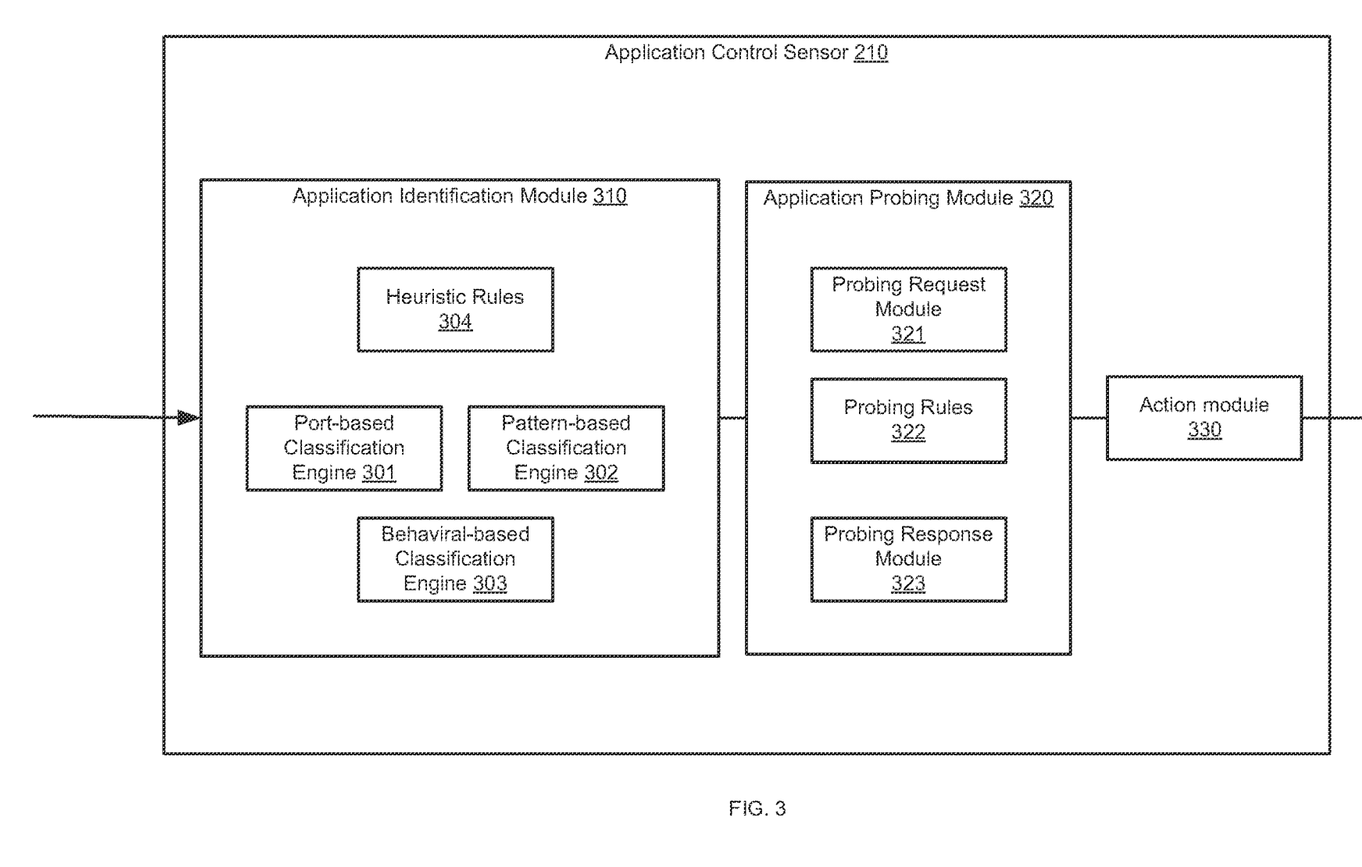
FIG. 3 is a block diagram conceptually illustrating interactions among various functional units of an application control sensor in accordance with an embodiment of the present invention.

FIG. 3 is a block diagram conceptually illustrating interactions among various functional units of an application control sensor 210 in accordance with an embodiment of the present invention. In the present embodiment, application control sensor 210 may identify a protocol that is used by network traffic passing through a gateway and take an action to the network traffic when/if the protocol is identified. In one embodiment, the protocol of the network traffic is identified by multiple traffic classification engines based on a heuristic rule. If the protocol is identified, a probing request that is compliant with the protocol is sent to a peer of the network traffic. If a response in compliance with the protocol is received by application control sensor 210, the protocol is verified to be accurate.

In the present embodiment, application control sensor 210 may comprise an application identification module 310, an active probing module 320 and an action module 330.

Application identification module 310 may include multiple traffic classification engines, such as a port-based classification engine 301, a pattern-based classification engine 302, a behavioral-based classification engine 303 and heuristic rules 304.

Port-based classification engine 301 can identify application layer protocols in network traffic by looking at the Transmission Control Protocol (TCP) and User Datagram Port (UDP) port numbers used by the server hosts. The Internet Assigned Numbers Authority (IRNA) manages a list of port-and-protocol mappings containing over 10,000 entries. Meanwhile, many other applications use fixed unofficial port numbers. Port-based classification engine 301 may at least partially identify the protocol in the network traffic based on the port numbers thereof.

Although port-based classification engine 301 may identify a protocol by accessing port numbers in a packet header, the result of port-based classification may be unreliable. Although the IRNA states that "Unassigned port numbers should not be used", many new protocols are designed to use TCP and UDP ports for communication without respecting the authority of the IRNA. Many P2P applications even purposely avoid using known port numbers in order to evade detection by firewalls. In order to detect protocols more accurately, pattern-based classification engine 302 can identify a protocol by inspecting packet payloads for known string patterns, which is also called deep packet inspection (DPI). For example, pattern-based classification engine 302 may examine whether data packets carry a well-known signature or follow well-known protocol semantics. If a signature for a specific protocol is matched, pattern-based classification engine 302 may determine that the protocol is used by the traffic.

Pattern-based classification is accompanied by higher complexity and may require access to more than a single packet's payload. When the packets are encrypted, deep packet inspection may require a significant amount of resources. Behavioral-based classification engine 303 is used for identifying protocols of network traffic without inspecting the payloads. Behavioral-based classification engine 303 may identify a protocol or a category of the protocol through statistical fingerprints of flow properties. For example, the protocol of network traffic may be identified by statistical fingerprinting of three traffic features, i.e., packet sizes, packet inter-arrival times and packet arrival order. In some embodiments, a specific protocol (HyperText Transfer Protocol (HTTP), File Transfer Protocol (FTP), Simple Mail Transfer Protocol (SMTP), Post Office Protocol 3 (POP3), etc.) of the network traffic may be classified by behavioral-based classification engine 303 based on the flow statistical information. In some other embodiments, a rough traffic category (e.g., web, bulk, interactive, P2P, etc.) rather than specific protocols may be identified. Behavioral-based classification engine 303 may deduce flow properties from training data and then identify a protocol in real-time based on the statistical fingerprints of the first several packets of a TCP session. Behavioral-based classification engine 303 may be used for identifying protocols of network traffic even when the network traffic is encrypted, proprietary or obfuscated.

Heuristic rules 304 are defined by the network administrators to control the operations of multiple classification engines and combine the results from individual engine to obtain a more accurate identification of network application. In one embodiment, a heuristic rule may designate one of the classification engines to conduct an initial detection of a protocol and conduct a heuristic analysis of the network traffic when the initial detection fails. In the heuristic detection stage, multiple classification engines join the detection and conduct protocol detections based on their own methods. The results of detection from multiple classification engines may be combined based on the heuristic rule to determine the protocol of the network traffic.

For example, pattern-based classification engine 302 may be designated by the heuristic rule to conduct an initial detection of a P2P protocol by deep packet inspection. When no P2P protocol is detected by matching signatures of known protocols, the heuristic rule may invoke port-based classification engine 301 to analyze the P2P protocol based on port numbers of data packets and invoke behavioral-based classification engine 303 to conduct the protocol classification through statistical fingerprinting. The results of port analysis, deep packet inspection and statistical fingerprinting may then be combined together based on weighted results of these analyses. A final result of protocol detection may be determined by the combined result.

In another embodiment, a heuristic rule may be defined in such a manner that multiple classification engines conduct the heuristic protocol detection serially. For example, port-based classification engine 301 may conduct the P2P protocol detection on a data packet first. If the P2P protocol cannot be detected by port-based analysis, deep packet inspection may then be conducted on the data packet by pattern-based classification engine 302. If no signature of the P2P protocol is matched, behavioral-based classification engine 303 may be invoked to identify the P2P protocol based on the statistical fingerprints of the data flow.

In a further embodiment, a heuristic rule may be defined in such a manner that multiple classification engines conduct the heuristic protocol detection in parallel without an initial detection. When some or all the classification engines begin protocol detections at the same time, different resources may be needed to do the detection and the result of each detection may be yielded at different times. A heuristic rule may coordinate the operations of the classification engines and combine the results to produce a final decision. For example, port-based analysis may generate a classification result in a very short time. As pattern-based analysis may consume a significant amount of computing resources when decryption and signature matching are needed, the result of pattern-based analysis may be available later than that of port-based analysis. Behavioral-based analysis may be conducted after enough data packets are captured. The result of behavioral-based analysis may be much later than other classification engines. In one embodiment, a heuristic rule may stop detection processing for a particular session when a satisfactory result is yielded from any one of the classification engines. In another embodiment, a heuristic rule may combine the results of multiple classification engines and stop detection for a particular session when a satisfactory combined result is obtained.

Application probing module 320 is used for determining a protocol of network traffic by performing active probing after a suspect protocol is initially detected by application identification module 310. Application probing module 320 may include a probing request module 321, probing rules 322 and probing response module 323. When a protocol is initially detected by application identification module 310, it may be a suspect protocol which may not be accurate even after the combination of multiple detections by heuristic rules. In order to make a more accurate determination, probing request module 321 may send a request based on the suspect protocol to the destination IP address of the network traffic. For example, if a hello or handshaking message is defined in the suspect protocol, probing request module 321 may send a hello or handshaking message of the suspect protocol to the destination IP address of the network traffic. If a user authentication procedure is defined in the suspect protocol, an authentication message of the suspect protocol may be sent by probing request module 321 to the destination IP address. In many P2P protocols, control messages may be sent between peers during their lifetime to maintain P2P connectivity. The control messages, such as version query, peer-list query, data query and the like may be sent in the form of UDP packets. In the present embodiment, when a suspect P2P protocol is detected, probing request module 321 may send a P2P control message to the destination IP of the network.

Probing response module 323 is used for receiving a response to the active probing request and analyzing if the response is a valid response of the suspect protocol. For example, after a hello message of the suspect protocol is sent as an active probing message by probing request module 321, probing response module 323 may wait for a response to the active probing message. If a response is received from the destination IP address within a predetermined or configurable time period and the response is verified to be a valid ACK message, application probing module 320 may determine that the suspect protocol is actually used by the network traffic that is being detected by the gateway. In another example, if the active probing message is a user authentication request, a response that accepts or rejects the authentication means that the peer is providing a service in accordance with the suspect protocol. Application probing module 320 may also determine that the host of the destination IP address is providing the service of the suspect protocol if a valid response is received from the host.

Probing rules 322 is used for defining what requests or message may be sent to a peer of the network traffic as a probing request. The behavior of application probing module 320 may look like a Distributed Denial of Service (DDoS) attack if a large number of active probing requests are sent out in a short time period by the application probing module. As such, the number of active probing messages may be limited in order to avoid such a scenario. For example, a probing rule may limit the total number of active probing messages that may be sent to an IP address in a given time period. Another probing rule may limit the total number of active probing messages that may be sent out to any IP address in a given time period.

After the application that generates the network traffic is detected by application identification module 310 and application probing module 320, action module 330 may take actions on the network traffic based on security policies defined by the network administrators. The actions may include blocking, allowing, logging and/or traffic shaping the network traffic. Security rules may include actions on the network traffic that are generated by a specific application or a category of applications. The same action may also be taken on the destination host of the network traffic when it is determined by an active probing message that the destination host is providing a service of a restricted protocol. As application control is well known to those skilled in the art, further description will be omitted for sake of brevity.

Figure 4:
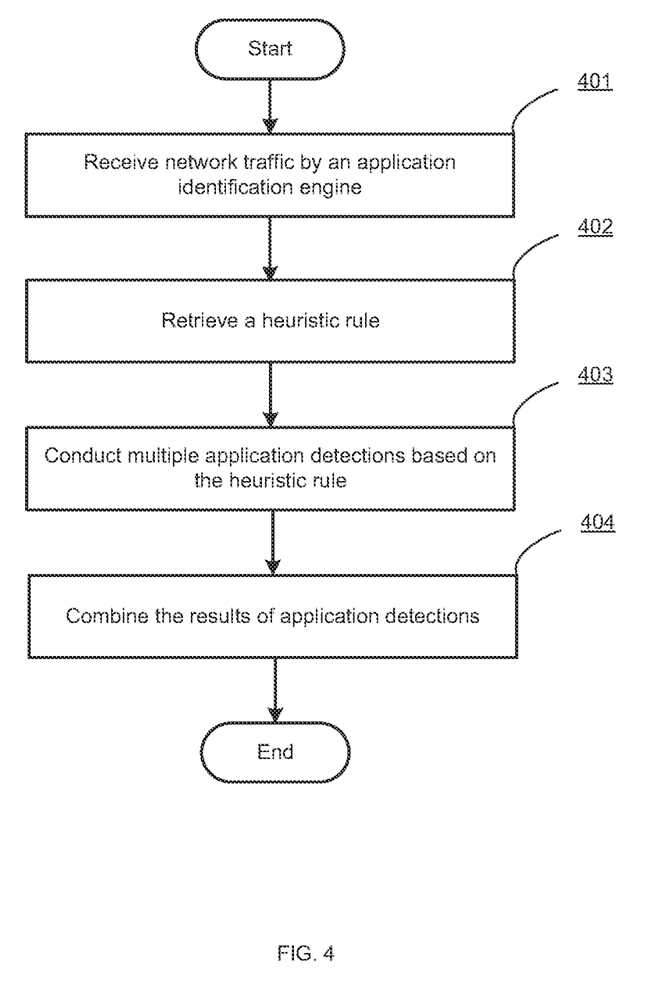
FIG. 4 is a flow diagram illustrating a method for detecting an application in a private network based on a heuristic rule in accordance with an embodiment of the present invention.

FIG. 4 is a flow diagram illustrating a method for detecting an application in a private network based on a heuristic rule in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 401, network traffic is intercepted by an application control sensor (e.g., application control sensor 210 of FIG. 2).

At block 402, a heuristic rule for application identification is retrieved by the application control sensor. The heuristic rule is used for controlling the processing, order and/or cooperation of multiple application identification engines of the application control sensor and combining the results of detections from the multiple application identification engines to make a better classification of the applications that is generating the network traffic. The heuristic rules may be defined by the network administrators and stored in the gateway. A predetermined or configurable threshold of identification result may be defined in the heuristic rule. When a combined result of multiple application identification engines exceeds the threshold, an application that is generating the network traffic may be determined by the application control sensor.

At block 403, the application control sensor conducts the application identification on the network traffic based on the heuristic rule. The application associated with the network traffic may be identified by a port-based classification engine wherein the application of the network traffic is determined by a list of port-and-application mapping. The application associated with the network may also be identified by a pattern-based classification engine wherein payloads of data packets are matched with known protocol signatures. The application may be further identified by a behavioral-based classification engine wherein statistical fingerprints of network traffic are analyzed to determine the protocol of the network traffic. The multiple application identification engines may conduct application detection processing in serial or in parallel on the network traffic and multiple application detection results may be generated by the application identification engines.

At block 404, the application detection results generated by the multiple application identification engines may be combined based on the heuristic rule. When the combination of the results exceeds a threshold defined in the heuristic rule, the determination of the application control sensor in relation to the application generating the network traffic may be deemed to be accurate.

Figure 5:
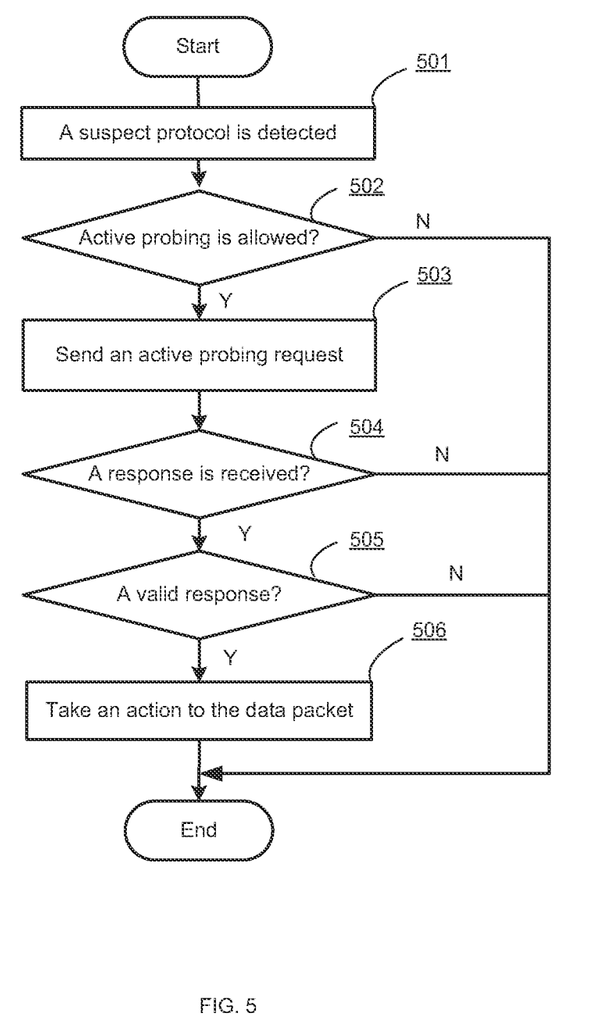
FIG. 5 is a flow diagram illustrating a method for detecting an application in a private network by active probing in accordance with an embodiment of the present invention.

FIG. 5 is a flow diagram illustrating a method for detecting an application in a private network by active probing in accordance with an embodiment of the present invention.

At block 501, a suspect protocol associated with network traffic is detected by an application control sensor. This may be performed by heuristic application detection as described above with reference to FIG. 4.

At block 502, the application control sensor may retrieve a probing rule and determine if active probing is allowed based on the probing rule. For example, if too many active probing requests have been sent within a particular time period and no more active probing is allowed based on the probing rule, the process may terminate without performing any active probing. If active probing is allowed, the process continues with block 503.

At block 503, the application control sensor sends out an active probing message to the destination host of the network traffic based on the suspect protocol. The active probing message may be a standard message defined in the suspect protocol, e.g., a hello message, a handshaking message, an authentication message or control messages between hosts of the network communications.

At block 504, the application control sensor waits for a response from the destination of the network traffic. If no response is received within an appropriate time period, the suspect protocol cannot be verified by active probing. If a timely response is received from the destination host, the process continues with block 505.

At block 505, the application control sensor may determine whether the response is a valid response of the suspect protocol. If it is a valid response, it means that the destination host is actually providing a service in relation to the suspect protocol and the suspect protocol detected by the application identification engine(s) is correct.

At block 506, the application control sensor takes an action on the network traffic or the destination host of the network traffic based on a rule associated with the protocol or application. For example, the traffic or the destination host may be blocked, allowed, logged or traffic shaped accordingly.

Figure 6:
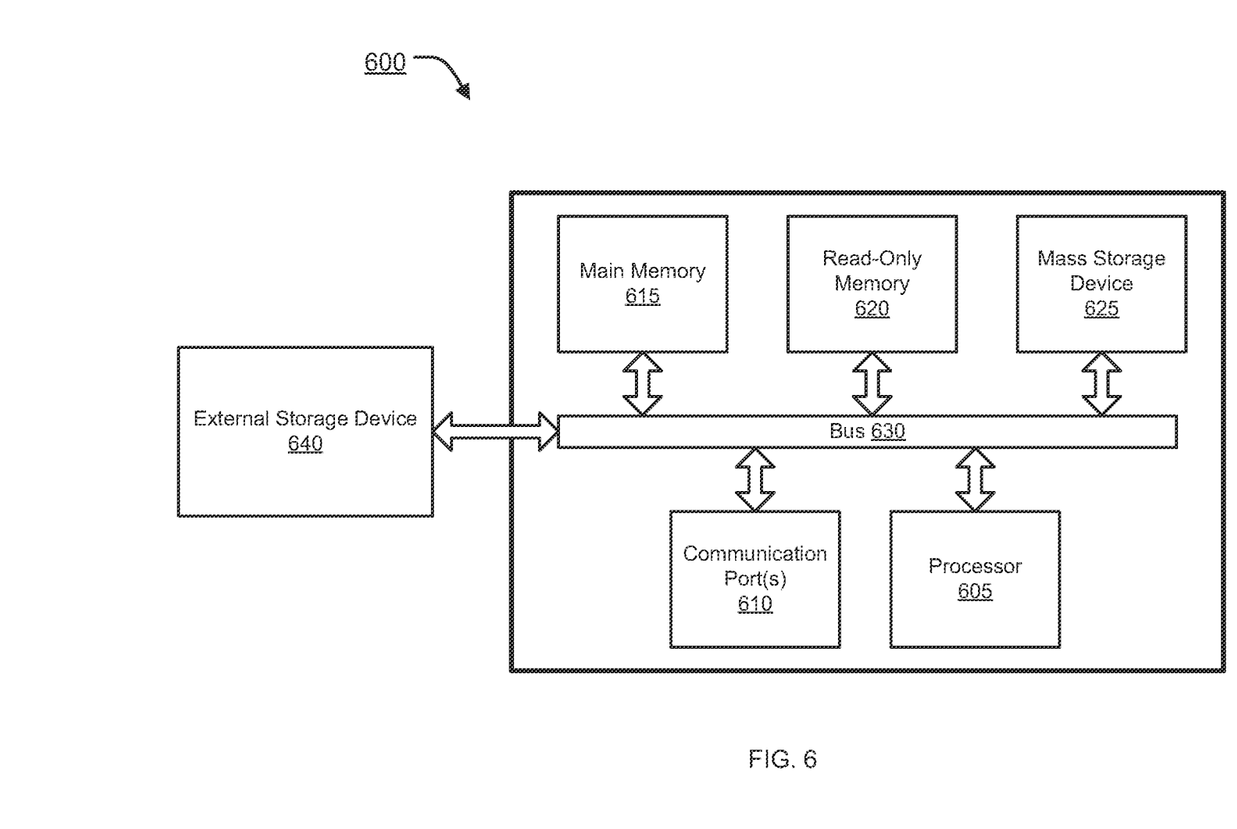
FIG. 6 is an exemplary computer system with which embodiments of the present invention may be utilized.

FIG. 6 is an example of a computer system 600 with which embodiments of the present disclosure may be utilized. Computer system 600 may represent or form a part of a network appliance, a network security device (e.g., a gateway or a firewall), a server or a client workstation.

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 605 may include various modules associated with embodiments of the present invention.

Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
   intercepting, by a network security device, network traffic passing through the network security device, wherein the network traffic is being exchanged between two peers;
   conducting, by the network security device, a heuristic detection of an application protocol used in the network traffic by a plurality of application protocol identifying engines, defined in a heuristic rule and including at least one application protocol identifying engine that classifies the network traffic with reference to training data and at least one application protocol identifying engine that classifies the network traffic without reference to training data, wherein the plurality of application protocol identifying engines are implemented in a form of a port-based classification engine, a pattern-based classification engine and a behavioral-based classification engine, wherein the port-based classification engine determines the application protocol based on a port number specified within the network traffic and with reference to a mapping of port numbers to applications, wherein the pattern-based classification engine determines the application by matching packet payloads of the network traffic with known protocol signatures, and wherein the behavioral-based classification engine determines the application protocol by analyzing statistical fingerprints of the network traffic; and
   identifying, by the network security device, the application protocol by weighting and combining results of the plurality of application protocol identifying engines as specified by the heuristic rule, including:
      performing port-based classification analysis by the port-based classification engine, pattern-based classification analysis by the pattern-based classification engine and behavioral-based analysis by the behavioral-based classification engine in a serial manner for a particular traffic session within the network traffic; and
      stopping the heuristic detection of the application protocol for the particular traffic session when a satisfactory classification result is achieved by a combination of two of the port-based classification engine, the pattern-based classification engine and the behavioral-based classification engine, wherein the satisfactory classification result meets a predetermined or configurable accuracy threshold specified by the heuristic rule.

2. The method of claim 1, further comprising:
   conducting an initial detection of the application protocol used in the network traffic by one of the plurality of application protocol identifying engines;
   when the initial detection of the application protocol fails, then performing said conducting a heuristic detection of an application protocol.

3. The method of claim 1, wherein the plurality of application protocol identifying engines conduct the heuristic detection in serial or in parallel.

4. The method of claim 1, wherein the application protocol comprises a protocol category or a specific application layer protocol.

5. The method of claim 1, wherein the application protocol comprises a peer-to-peer (P2P) protocol.

6. A network security device comprising:
   a non-transitory storage device having tangibly embodied therein instructions representing an application control sensor; and
   one or more processors coupled to the non-transitory storage device and operable to execute the application control sensor to perform a method comprising:
      intercepting network traffic passing through the network security device, wherein the network traffic is being exchanged between two peers;
      conducting a heuristic detection of an application protocol used in the network traffic by a plurality of application protocol identifying engines, defined in a heuristic rule and including at least one application protocol identifying engine that classifies the network traffic with reference to training data and at least one application protocol identifying engine that classifies the network traffic without reference to training data, wherein the plurality of application protocol identifying engines are implemented in a form of a port-based classification engine, a pattern-based classification engine and a behavioral-based classification engine, wherein the port-based classification engine determines the application protocol based on a port number specified within the network traffic and with reference to a mapping of port numbers to applications, wherein the pattern-based classification engine determines the application by matching packet payloads of the network traffic with known protocol signatures, and wherein the behavioral-based classification engine determines the application protocol by analyzing statistical fingerprints of the network traffic; and
      identifying the application protocol by weighting and combining results of the plurality of application protocol identifying engines as specified by the heuristic rule, including:
         performing port-based classification analysis by the port-based classification engine, pattern-based classification analysis by the pattern-based classification engine and behavioral-based analysis by the behavioral-based classification engine in a serial manner for a particular traffic session within the network traffic; and
         stopping the heuristic detection of the application protocol for the particular traffic session when a satisfactory classification result is achieved by a combination of two of the port-based classification engine, the pattern-based classification engine and the behavioral-based classification engine, wherein the satisfactory classification result meets a predetermined or configurable accuracy threshold specified by the heuristic rule.

7. The network security device of claim 6, wherein the method further comprises:
   conducting an initial detection of the application protocol used in the network traffic by one of the plurality of application protocol identifying engines;
   when the initial detection of the application protocol fails, then performing said conducting a heuristic detection of an application protocol.

8. The network security device of claim 6, wherein the plurality of application protocol identifying engines conduct the heuristic detection in serial or in parallel.

9. The network security device of claim 6, wherein the application protocol comprises a protocol category or a specific application layer protocol.

10. The network security device of claim 6, wherein the application protocol comprises a peer-to-peer (P2P) protocol.

\* \* \* \* \*